US012790990B2

(12) United States Patent
Guo et al.

(10) Patent No.: US 12,790,990 B2
(45) Date of Patent: Nov. 10, 2026

(54) ENGINE OVERSPEED AIR SHUT-OFF SYSTEM

(71) Applicant: Zhejiang chuangge technology co., ltd, Shaoxing (CN)

(72) Inventors: Jianfeng Guo, Shaoxing (CN); Ning Fang, Shaoxing (CN)

(73) Assignee: Zhejiang chuangge technology co., ltd, Shaoxing (CN)

( * ) Notice: Subject to any disclaimer, the term of this patent is extended or adjusted under 35 U.S.C. 154(b) by 163 days.

(21) Appl. No.: 18/812,969

(22) Filed: Aug. 22, 2024

(65) Prior Publication Data

US 2025/0347255 A1 Nov. 13, 2025

(30) Foreign Application Priority Data

May 7, 2024 (CN) ......................... 202410554221.7

(51) Int. Cl.
*F02D 17/04* (2006.01)
*F02D 41/00* (2006.01)
*F02D 41/04* (2006.01)

(52) U.S. Cl.
CPC ......... *F02D 17/04* (2013.01); *F02D 41/0002* (2013.01); *F02D 41/042* (2013.01)

(58) Field of Classification Search
CPC ..... F02D 17/04; F02D 41/0002; F02D 41/042
See application file for complete search history.

(56) References Cited

U.S. PATENT DOCUMENTS

2009/0159027 A1* 6/2009 Nakamura .............. F01L 1/022
123/90.17
2017/0314485 A1* 11/2017 Chen .......................... F16K 3/06

* cited by examiner

*Primary Examiner* — Grant Moubry
*Assistant Examiner* — Ruben Picon-Feliciano

(57) ABSTRACT

The present application discloses an engine overspeed air shut-off system, which comprises an electric locking mechanism, a manual locking mechanism, a valve plate and a support seat, wherein the support seat is installed on an air circuit of a diesel engine and is provided with an air passage communicated with the air circuit; and the valve plate can be rotated under the electric or manual driving action of the electric locking mechanism or the manual locking mechanism to cut off or open the air passage. A support seat with an air passage is additionally arranged on the air circuit of the diesel engine, and an electric locking mechanism or a manual locking mechanism is adopted to make the valve plate rotate and cut off or open the air passage under the action of electric or manual driving.

19 Claims, 15 Drawing Sheets

ENGINE OVERSPEED AIR SHUT-OFF SYSTEM

CROSS-REFERENCE TO RELATED APPLICATIONS

This application claims priority of Chinese Patent Application No. 202410554221.7, filed on May 7, 2024, the entire contents of which are incorporated herein by reference.

TECHNICAL FIELD

The present application relates to the technical field of engines, in particular to the technical field of engine overspeed air shut-off systems.

BACKGROUND

Diesel engine is an engine that burns diesel to obtain energy release, such as the 12-cylinder water-cooled diesel engine disclosed in the present application with a publication number of CN106224094A and the diesel engine disclosed in the present application with a publication number of CN116324141B. Diesel engine has the characteristics of large torque, high thermal efficiency and good economic performance, and is usually used in mobile equipment or transportation tools (such as trucks, trucks, forklifts, cranes, workover equipment, drilling rigs, excavators, portable generators and welding trucks), emergency vehicles (such as fire engines and ambulances) and small processing devices (such as lawn mowers, blowers, generators, compressors, welding machines and pumps).

Diesel engines do not need spark plugs to ignite the mixture in the cylinders. When the running diesel engine inhales the external fuel source, as long as there is enough external fuel available, even if the ignition switch is turned off or the engine oil supply is cut off, the engine will not stop. Uncontrolled external fuel supply will accelerate the engine and lead to engine out of control (any diesel engine running in an environment where combustible steam may exist in the air, whether intentionally or unintentionally, may cause engine out of control).

For this reason, the applicant found that the engine can be protected from exceeding the speed of the expected function of the engine by adding an air valve to cut off the air supply to the air inlet of the diesel engine. However, the valve in the market (including the valve plate that can control the cutting and opening of the pipeline and the locking mechanism (built-in lock head and lock rod) that can lock the position of the valve plate) has the following problems: (1) on the one hand, the existing locking mechanism requires high initial installation accuracy of the lock rod and lock head (otherwise, the lock rod and lock head cannot engage normally), on the other hand, the lock rod and lock head cannot work in cooperation normally due to wear after working for a long time, and it is troublesome and costly to directly disassemble and replace the lock rod and lock head; (2) the lock rod is usually reset directly by the torsion spring, which is not only inconvenient for later disassembly and replacement, but also leads to the fact that the maintenance personnel cannot directly control and check the lock rod externally, which has certain security risks; (3) the lock head is usually driven by the motor to rotate and complete the locking or unlocking operation together with the lock rod, and once the motor fails or the motor is actively or passively powered off (such as power failure), the lock head cannot rotate normally, which makes it difficult for the maintenance personnel to carry out the follow-up maintenance work.

SUMMARY

The object of the present application is to solve the problems in the prior art, and provides an engine overspeed air shut-off system, which can make the valve plate rotate and cut off or open the air passage under the action of electric or manual driving, and can quickly stop the diesel engine after cutting off the air supply, thus effectively preventing the diesel engine from overspeed due to intake of external fuel sources.

In order to achieve the above object, the present application provides an engine overspeed air shut-off system, which includes an electric locking mechanism, a manual locking mechanism, a valve plate and a support seat, wherein the support seat is installed on an air circuit of a diesel engine and is provided with an air passage communicated with the air circuit; and the valve plate is rotatable under an electric or manual driving action of the electric locking mechanism or the manual locking mechanism to cut off or open the air passage.

Preferably, the electric locking mechanism includes a lock rod, a lock head, an elastic return mechanism, a shell, a motor and a guide rod; the lock head includes a seat, a pyramid and a positioning bolt; the seat is hinged in the shell and is driven by the motor to rotate; one end of the pyramid is provided with a sharp corner and the other end is inserted into the seat; a screw of the positioning bolt is in threaded connection with the pyramid after being inserted into the seat; the lock rod includes a base rod part and a base block part; one end of the base rod part is hinged with the shell, while the other end is guided by the guide rod and can automatically approach the lock head under the drive of the elastic return mechanism; the base block part is detachably connected with the base rod part, and an outer wall of the base block part is provided with a block convex corner and forms a step which can be matched with the sharp corner.

Preferably, a rod through groove penetrating a top surface and a bottom surface is formed on the base rod part; the base block part is inserted into the rod through groove, and a groove wall of the rod through groove is provided with a plurality of rod guide grooves; the base block part is provided with a plurality of block ribs corresponding to respective rod guide groove one by one, the top surface of the base rod part is further provided with a rod lower groove, and a side of the base block part facing away from the block convex corner is provided with a block screw; a free end of the block screw is threaded with a block nut after passing through the base rod part along the rod lower groove.

Preferably, the sharp corner is composed of a cone inclined and a cone cambered surface that are intersecting with each other, and a cone insert post with a cone screw hole is arranged above the pyramid; the seat is provided with a seat socket into which the cone insert post can be inserted and a seat long slot penetrating the top surface and the seat socket, and the cone screw hole is movable along the seat long slot when the cone insert post is inserted or pulled out of the seat socket.

Preferably, the shell includes a shell body and a shell cover, and the elastic return mechanism includes a stem, a backing plate a reset spring and an adjusting terminal; one end of the stem is screwed into the backing plate, while the other end is screwed through the adjusting terminal after passing through the base rod part, the reset spring and the shell body successively; the reset spring has an elastic tendency of elongation, so that one end thereof and the backing plate jointly clamp the lock rod and the other end thereof and the adjusting terminal jointly clamp the shell; and a top opening of the shell body is closed by the shell cover.

Preferably, the manual locking mechanism includes a rotating shaft, a reset spring and a hand opening, wherein one end of the rotating shaft is fixed with the lock head and the other end is coaxially connected with the hand opening after passing through the support seat; the reset spring is sleeved outside the rotating shaft and can realize the reset of the rotating shaft by an elastic force.

Preferably, the manual locking mechanism further includes a coupling head, which includes a coupling plate and a coupling sleeve; the coupling sleeve is integrally arranged at the bottom of the coupling plate and a central passage is arranged between the coupling sleeve and the coupling plate in a penetrating manner; the coupling sleeve is provided with a plurality of sleeve transverse holes communicated with the central channel respectively, a top end of the rotating shaft is inserted into the central channel and provided with a plurality of shaft transverse holes corresponding to each sleeve transverse hole respectively; and the rotating shaft and the coupling sleeve are detachably connected by fasteners passing through the corresponding shaft transverse holes and sleeve transverse holes.

Preferably, a plurality of plate lower through holes arranged around the coupling sleeve are provided on the coupling plate; the hand opening includes a hand opening plate and a hand opening sleeve, and the hand opening sleeve is integrally arranged on the top of the hand opening plate, with a top surface being provided with a hexagonal bump; the hand opening plate is provided with a plurality of plate upper through holes corresponding to each of the plate lower through holes respectively, and the coupling plate and the hand opening plate are detachably connected by fasteners penetrating the corresponding plate lower through holes and the plate upper through holes.

Preferably, a sleeve ring groove located below each sleeve transverse hole is arranged on the coupling sleeve; an isolation sleeve is sleeved outside the sleeve ring groove, and the rotating shaft, the coupling head and the reset spring are simultaneously covered with a protective cover with a notch at the top; the top surface of the support seat is further provided with a stepped groove with a big top and a small bottom; a shaft sealing ring is built in a lower section of the stepped groove and a shaft pressing ring is built in an upper section; the shaft sealing ring is confined between the rotating shaft, the shaft pressing ring and the support seat; and two ends of the reset spring are respectively fixed with the coupling head and the support seat.

Preferably, the support seat includes a base body and a base cover, which are detachably connected by fasteners and are respectively provided with corresponding body holes and cover holes, wherein the body hole and the cover hole together form an air passage; the adjacent surfaces of the base body and the base cover are also provided with concave parts for the valve plate to move, and the electric locking mechanism and the manual locking mechanism are respectively arranged on the opposite surfaces of the base body and the base cover.

The present application has the following beneficial effects.

1) By installing a support seat with an air passage on the air circuit of the diesel engine, and adopting an electric locking mechanism or a manual locking mechanism to make the valve plate rotate and cut off or open the air passage under the action of electric or manual driving, the diesel engine can quickly stop working after the air supply is cut off, thus effectively preventing the diesel engine from overspeed due to intake of external fuel sources.

2) By combining the base rod part and the base block part which are detachably connected together to form a lock rod, at the same time, the outer wall of the base block part is provided with a block convex corner and a step which can be matched with the lock head is formed, so that when the step can not be matched with the lock head due to installation accuracy or wear, users can select and disassemble the base block part with block convex corners with different sizes or shapes, thus reducing the initial installation accuracy requirement and the component disassembly and replacement cost, and avoiding material waste to a certain extent, which is more green and environmentally friendly.

3) By adding the rod lower groove on the top surface of the base rod part and allowing the block screw of the base block part to pass through, the base rod part and the base block part can be locked by using the block nut screwed outside the block screw.

4) One end of the pyramid is provided with a sharp corner and the other end is provided with a cone insert post with a cone screw hole, and a seat socket for inserting the cone insert post and a seat long slot penetrating the top surface and the seat socket are added on the seat, so that the depth of inserting the cone insert post into the seat socket can be freely controlled according to needs, and the position of the seat body and the pyramid can be fixed by using positioning bolts, so that the extension length of the sharp corner can be adjusted, on the one hand, the initial installation accuracy requirement can be reduced, and on the other hand, only the pyramid needs to be replaced to reduce maintenance when the sharp corner is worn.

5) By screwing one end of the stem with the backing plate located inside the shell, the other end of the stem is threaded through the adjusting terminal located outside the shell, and the reset spring is sleeved outside the stem, so that the length of the stem into which the adjusting terminal is screwed can be controlled according to the sizes of the shell and the locking rod until the reset spring with an elongated elastic tendency can be matched with the backing plate and the adjusting terminal respectively to clamp the locking rod and the shell and replace the torsion spring to realize the return of the locking rod, and the external adjusting terminal is convenient for maintenance workers to hold and pull and indirectly control the lock rod, which can effectively improve the maintenance safety.

6) By connecting the rotating shaft which can be driven by the motor to rotate with the hand opening and the lock head respectively, and arranging a reset spring outside the rotating shaft, the rotating shaft can be driven to rotate electrically by the motor or manually by the hand opening, and finally the electric and manual double-opening of the lock head is realized, and the reset spring can force the rotating shaft to reset by elastic force when the motor or the hand opening stops driving, so that the overall structure is simple, and the use is more convenient and safe.

7) By installing a coupling head fixed by a fastener between the hand opening head and the rotating shaft, the reset spring is respectively inserted with the coupling head and the support seat through the top plug and the bottom plug located at the top end and the bottom end, which not only ensures the stable connection of all components, but also facilitates the rapid disassembly and maintenance of all components.

8) The isolation sleeve is sleeved on the coupling head, and the shaft sealing ring is installed in the step groove on the top surface of the support seat, so that the isolation sleeve and the shaft sealing ring can be used to prevent the coupling head and the support seat from being directly worn by the movable reset spring respectively.

The features and advantages of the present application will be described in detail by examples with the accompanying drawings.

Figure 1:
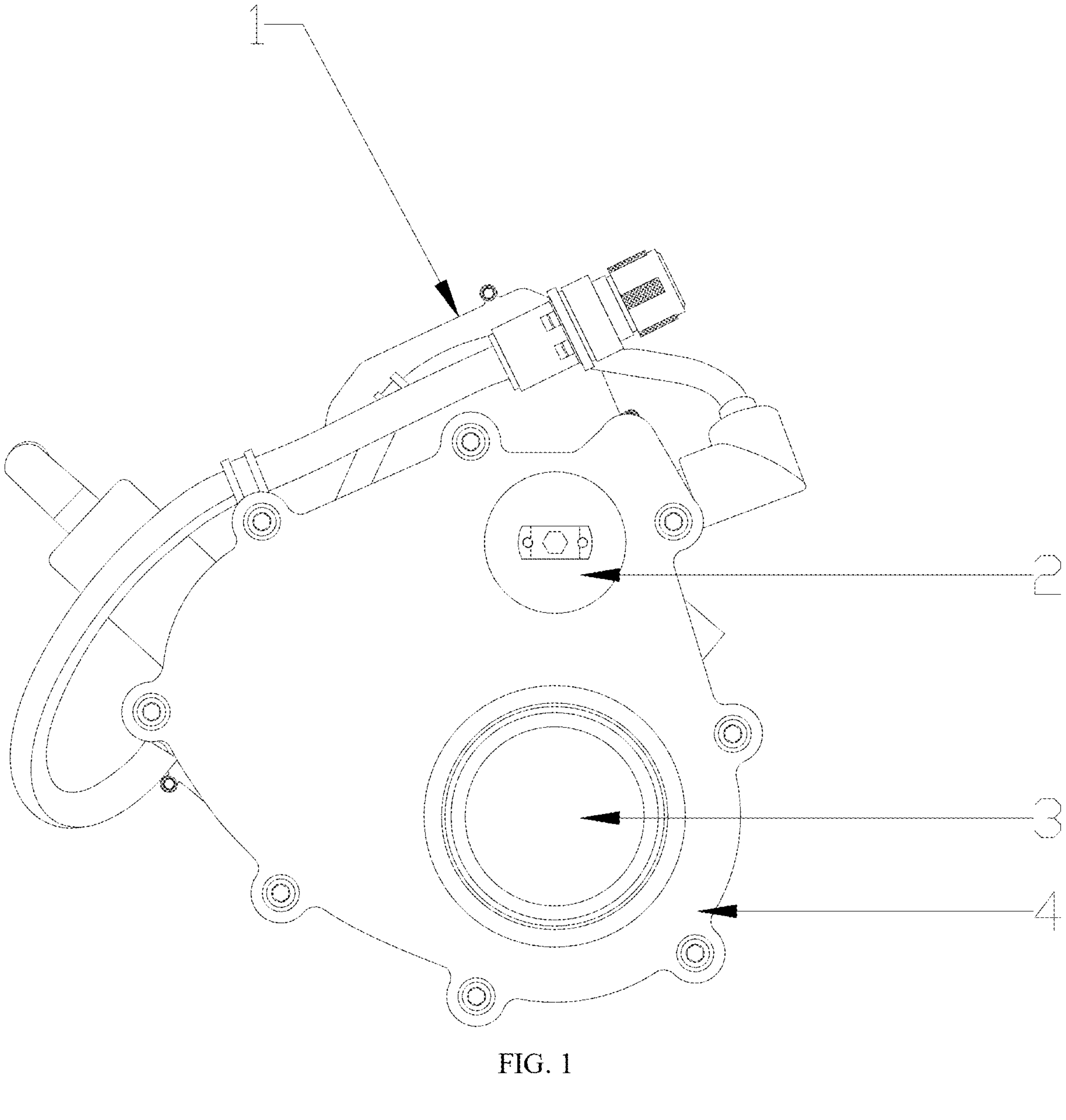
FIG. 1 is a front view of an engine overspeed air shut-off system of the present application.
Figure 2:
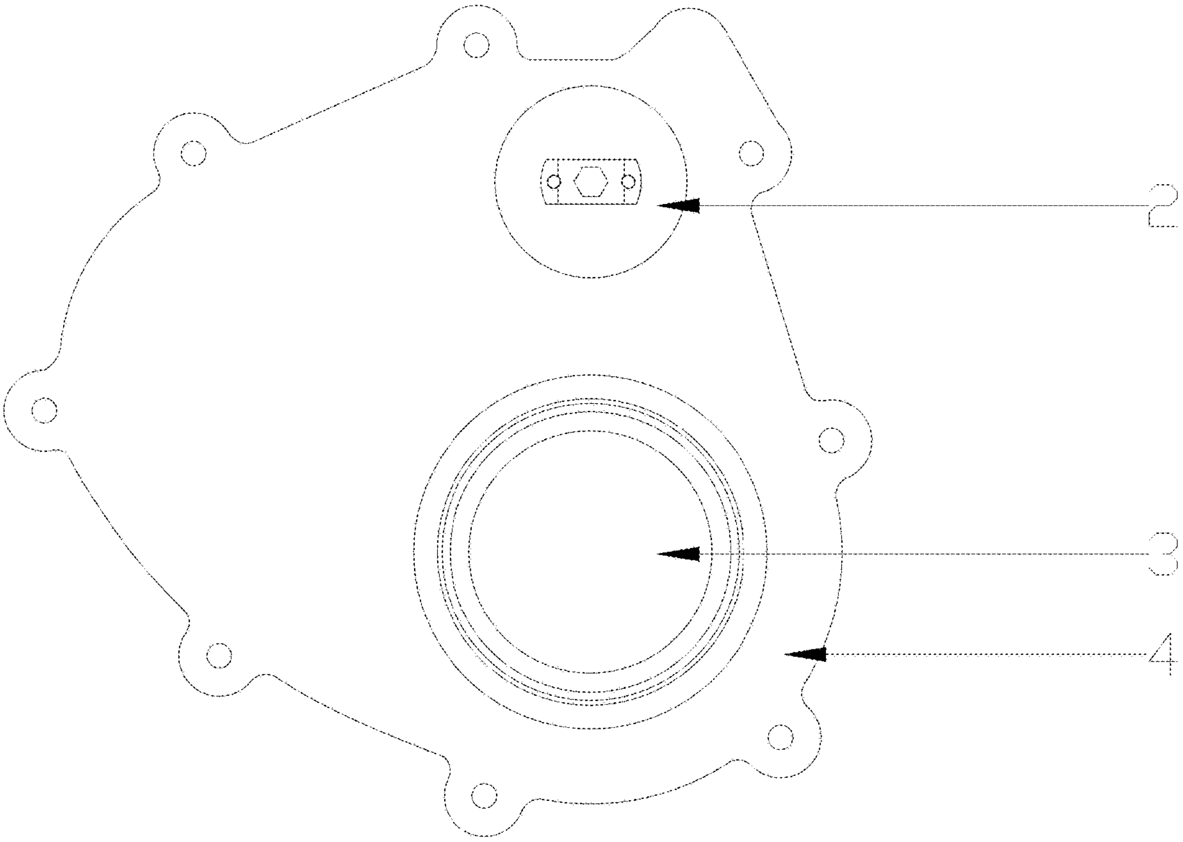
FIG. 2 is a front view of the engine overspeed air shut-off system of the present application after removing the pipeline.
Figure 3:
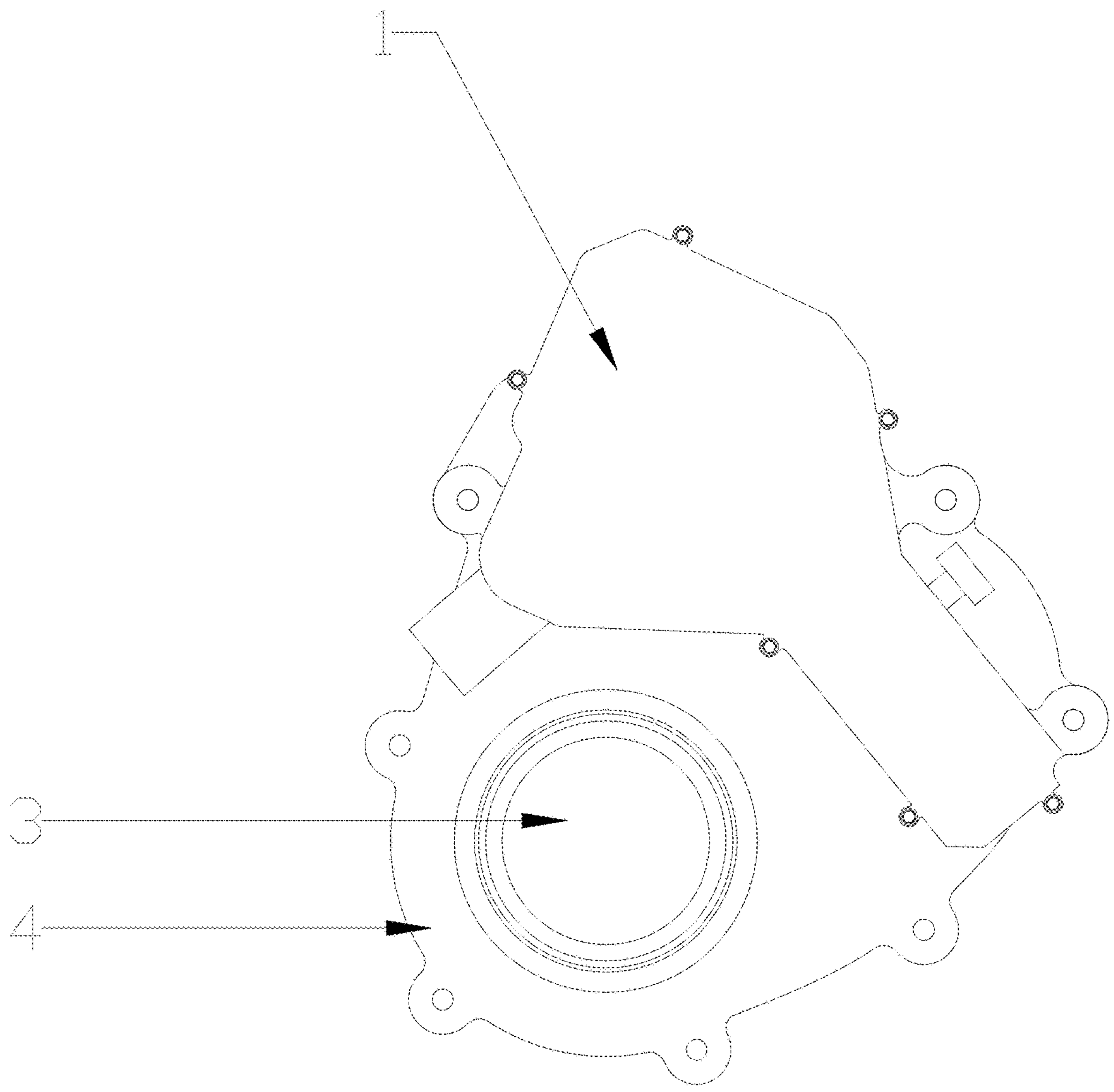
FIG. 3 is a rear view of the engine overspeed air shut-off system of the present application after removing the pipeline.

Reference signs: 1—Electric locking mechanism, 11—Lock rod, 111—Base rod part, 1111—Rod through groove, 1112—Rod guide groove, 1113—Rod lower groove, 112—Base block part, 1121—Block convex corner, 1122—Block rib, 1123—Block screw, 12—Lock head, 121—Seat body, 1211—Seat body socket, 1212—Seat long slot, 122—Pyramid, 1221—Cone inclined surface, 1222—Cone cambered surface, 1223—Cone insert post, 1224—Cone screw hole, 123—Positioning bolt, 13—Elastic return mechanism, 131—Stem, 132—Backing plate, 133—Reset spring, 134—Adjusting terminal, 14—Shell, 141—Shell body, 142—Shell cover, 15—Motor, 16—Guide rod, 2—Manual locking mechanism, 21—Rotating shaft, 22—Coupling head, 221—Coupling plate, 2211—Plate lower through hole, 222—Coupling sleeve, 2221—Sleeve transverse hole, 2222—Sleeve ring groove, 23—Reset spring, 24—Hand opening head, 241—Hand opening plate, 2411—Plarte upper through hole, 242—Hand opening sleeve, 2421—Hexagon bump, 25—Isolation sleeve, 26—Protective cover, 27—Shaft sealing ring, 28—Shaft pressing ring, 3—Valve plate, 4—Support seat, 41—Base body, 411—Body hole, 42—Base cover, 421—Cover hole.

DESCRIPTION OF EMBODIMENTS

Referring to FIG. 1 to FIG. 17, the engine overspeed air shut-off system of the present application includes an electric locking mechanism 1, a manual locking mechanism 2, a valve plate 3 and a support seat 4, wherein the support seat 4 is installed on an air circuit of a diesel engine and is provided with an air passage communicated with the air circuit; and the valve plate 3 is rotatable under an electric or manual driving action of the electric locking mechanism 1 or the manual locking mechanism 2 to cut off or open the air passage.

The electric locking mechanism 1 comprises a lock rod 11, a lock head 12, an elastic return mechanism 13, a shell 14, a motor 15 and a guide rod 16; the lock head 12 comprises a seat 121, a pyramid 122 and a positioning bolt 123; the seat 121 is hinged in the shell 14 and is driven by the motor 15 to rotate; one end of the pyramid 122 is provided with a sharp corner and the other end is inserted into the seat 121; a screw of the positioning bolt 123 is in threaded connection with the pyramid 122 after being inserted into the seat 121; the lock rod 11 comprises a base rod part 111 and a base block part 112; one end of the base rod part 111 is hinged with the shell 14, while the other end is guided by the guide rod 16 and can automatically approach the lock head 12 under the drive of the elastic return mechanism 13; the base block part 112 is detachably connected with the base rod part 111, and an outer wall of the base block part 112 is provided with a block convex corner 1121 and forms a step which can be matched with the sharp corner.

A rod through groove 1111 penetrating a top surface and a bottom surface is formed on the base rod part 111; the base block part 112 is inserted into the rod through groove 1111, and a groove wall of the rod through groove 1111 is provided with a plurality of rod guide grooves 1111; the base block part 112 is provided with a plurality of block ribs 1122 corresponding to respective rod guide groove 1112 one by one, the top surface of the base rod part 111 is further provided with a rod lower groove 1113, and a side of the base block part 112 facing away from the block convex corner 1121 is provided with a block screw 112; a free end of the block screw 1123 is threaded with a block nut after passing through the base rod part 111 along the rod lower groove 1113.

The sharp corner is composed of a cone inclined surface 1221 and a cone cambered surface 1222 that are intersecting with each other, and a cone insert post 1223 with a cone screw hole 1224 is arranged above the pyramid 122; the seat 121 is provided with a seat socket 1211 into which the cone insert post 1223 can be inserted and a seat long slot 1212 penetrating the top surface and the seat socket 1211, and the cone screw hole 1224 is movable along the seat long slot 1212 when the cone insert post 1223 is inserted or pulled out of the seat socket 1211.

The shell 14 comprises a shell body 141 and a shell cover 142, and the elastic return mechanism 13 comprises a stem 131, a backing plate 132, a reset spring 133 and an adjusting terminal 134; one end of the stem 131 is screwed into the backing plate 132, while the other end is screwed through the adjusting terminal 134 after passing through the base rod part 111, the reset spring 133 and the shell body 141 successively; the reset spring 133 has an elastic tendency of elongation, so that one end thereof and the backing plate 132 jointly clamp the lock rod 11 and the other end thereof and the adjusting terminal 134 jointly clamp the shell 141; and a top opening of the shell body 141 is closed by the shell cover 142.

The manual locking mechanism 2 comprises a rotating shaft 21, a reset spring 23 and a hand opening 24, wherein one end of the rotating shaft 21 is fixed with the lock head 12 and the other end is coaxially connected with the hand opening 24 after passing through the support seat 4; the reset spring 23 is sleeved outside the rotating shaft 21 and can realize the reset of the rotating shaft 21 by an elastic force.

The manual locking mechanism 2 further comprises a coupling head 22, which comprises a coupling plate 221 and a coupling sleeve 222; the coupling sleeve 222 is integrally arranged at the bottom of the coupling plate 221 and a central passage is arranged between the coupling sleeve 222 and the coupling plate 221 in a penetrating manner; the coupling sleeve 222 is provided with a plurality of sleeve transverse holes 2221 communicated with the central channel respectively, a top end of the rotating shaft 21 is inserted into the central channel and provided with a plurality of shaft transverse holes corresponding to each sleeve transverse hole 2221 respectively; and the rotating shaft 21 and the coupling sleeve 222 are detachably connected by fasteners passing through the corresponding shaft transverse holes and sleeve transverse holes 2221.

A plurality of plate lower through holes 2211 arranged around the coupling sleeve 222 are provided on the coupling plate 221; the hand opening 24 comprises a hand opening plate 241 and a hand opening sleeve 242, and the hand opening sleeve 242 is integrally arranged on the top of the hand opening plate 241, with a top surface being provided with a hexagonal bump 2421; the hand opening plate 241 is provided with a plurality of plate upper through holes 2411 corresponding to each of the plate lower through holes 2211 respectively, and the coupling plate 221 and the hand opening plate 241 are detachably connected by fasteners penetrating the corresponding plate lower through holes 2211 and the plate upper through holes 2411.

A sleeve ring groove 2222 located below each sleeve transverse hole 2221 is arranged on the coupling sleeve 222; an isolation sleeve 25 is sleeved outside the sleeve ring groove 2222, and the rotating shaft 21, the coupling head 22 and the reset spring 23 are simultaneously covered with a protective cover 26 with a notch at the top; the top surface of the support seat 4 is further provided with a stepped groove with a big top and a small bottom; a shaft sealing ring 27 is built in a lower section of the stepped groove and a shaft pressing ring 28 is built in an upper section; the shaft sealing ring 27 is confined between the rotating shaft 21, the shaft pressing ring 28 and the support seat 4; and two ends of the reset spring 23 are respectively fixed with the coupling head 22 and the support seat 4.

The support seat 4 comprises a base body 41 and a base cover 42, which are detachably connected by fasteners and are respectively provided with corresponding body holes 411 and cover holes 421, wherein the body hole 411 and the cover hole 421 together form an air passage; the adjacent surfaces of the base body 41 and the base cover 42 are also provided with concave parts for the valve plate 3 to move, and the electric locking mechanism 1 and the manual locking mechanism 2 are respectively arranged on the opposite surfaces of the base body 41 and the base cover 42. The work process of that application include the following steps:

when the diesel engine needs to stop working immediately, the valve plate 3 can be driven to rotate electrically or manually through the electric locking mechanism 1 or the manual locking mechanism 2 until the valve plate 3 cuts off the air passage of the support seat 4 (that is, cuts off the air circuit of the diesel engine), so that the diesel engine overspeed phenomenon caused by the intake of external fuel sources can be avoided by stopping the air supply of the diesel engine.

1) The installation process and working mode of the electric locking mechanism 1 are as follows:

For the lock rod 11, firstly, the base block 112 is inserted into the base rod part 111 along the rod through groove 1111, and at the same time, the block screw 1123 penetrates through the base rod part 111 along the rod lower groove 1113, wherein the rod guide groove 1112 and the block rib 1122 guide the insertion of the base block 112. Next, a block nut is screwed on the block screw 1123 until the block nut is closely attached to the base rod part 111.

For the lock head 12, firstly, the insertion depth of the cone pin 1223 into the socket 1211 is adjusted as needed. Next, the screw bottom of the positioning bolt 123 is first inserted into the seat 121 along the seat long groove 1212, and then screwed into the cone screw hole 1224.

For the elastic return mechanism 13, the backing plate 132 and the reset spring 133 are respectively placed in the inner cavity of the shell 14. Next, one end of the stem 131 passes through the shell 14, the reset spring 133 and the lock rod 11, and then is screwed into the inside of the backing plate 132, and then the adjusting terminal 134 is screwed on the end of the stem 131 exposed outside the shell 14.

Figure 4:
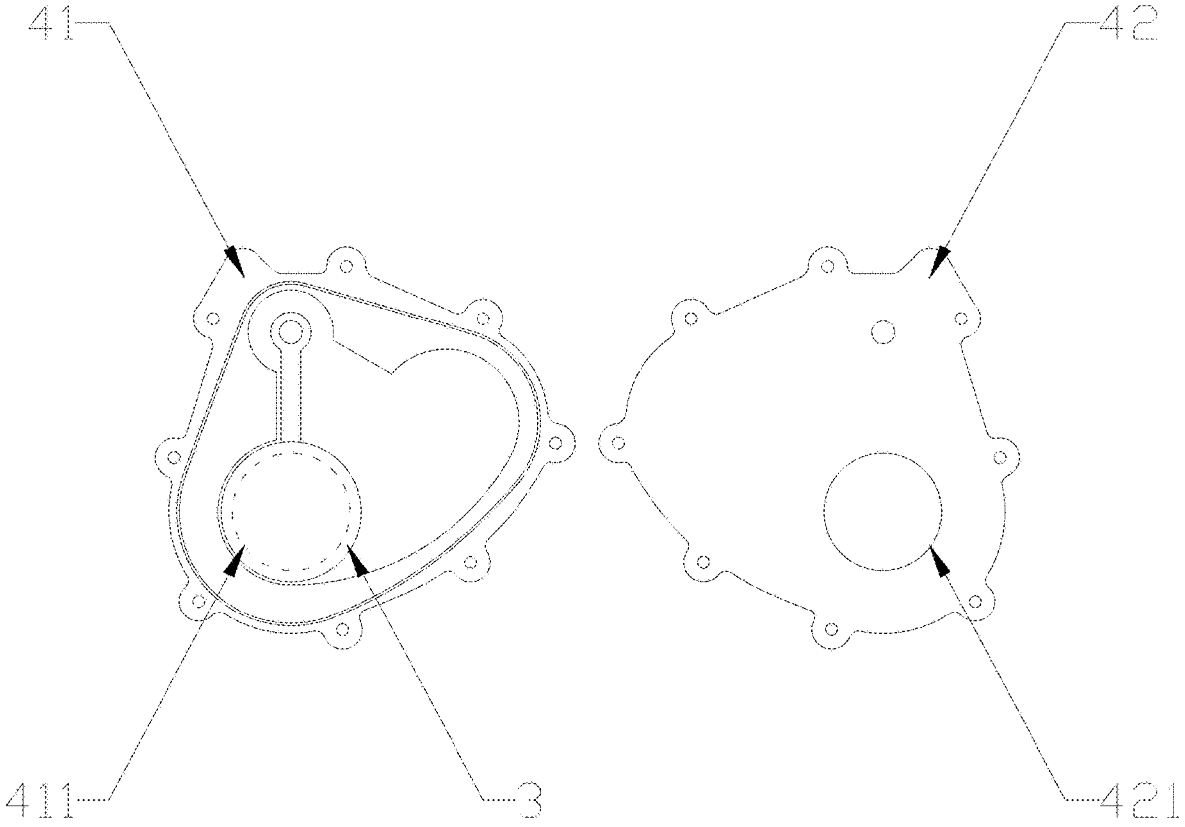
FIG. 4 is an assembly diagram of the valve plate and the support seat of the engine overspeed air shut-off system of the present application.
Figure 5:
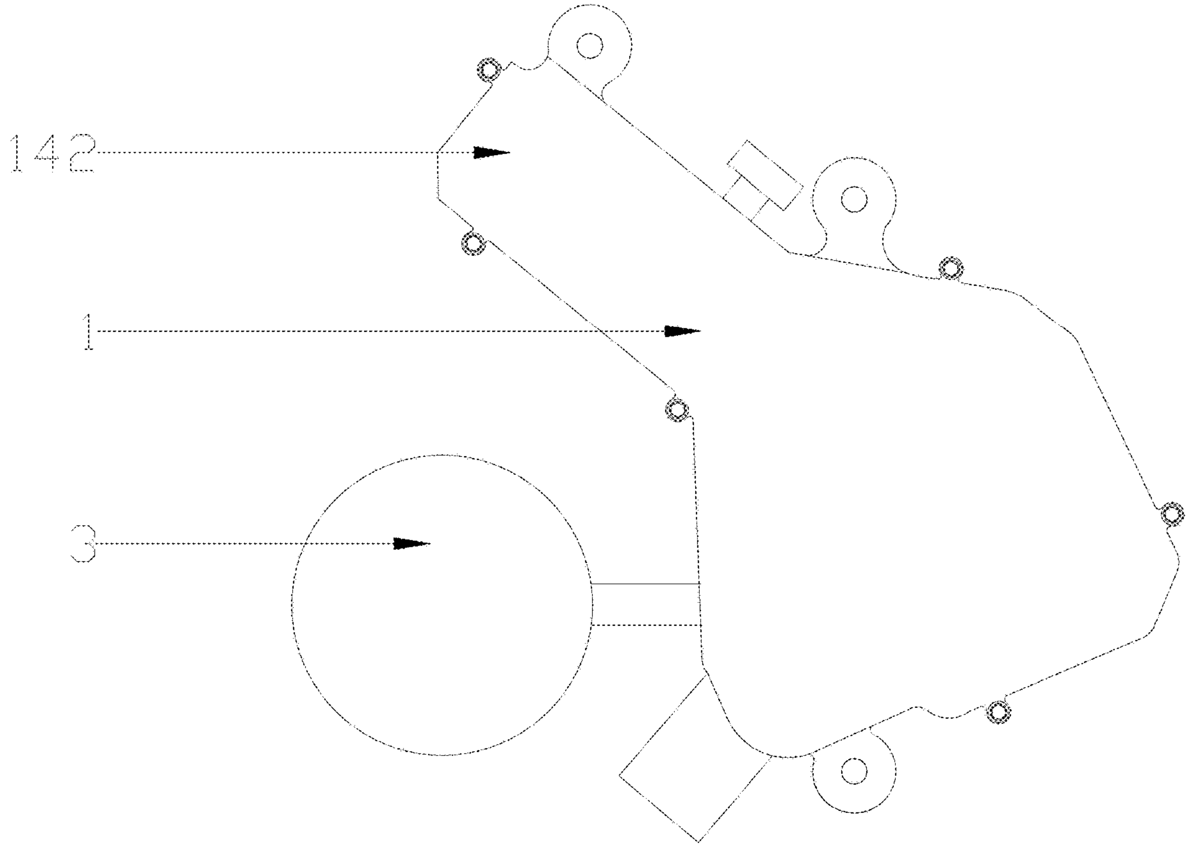
FIG. 5 is a schematic diagram of the electric locking mechanism and valve plate assembly of the engine overspeed air shut-off system of the present application.
Figure 6:
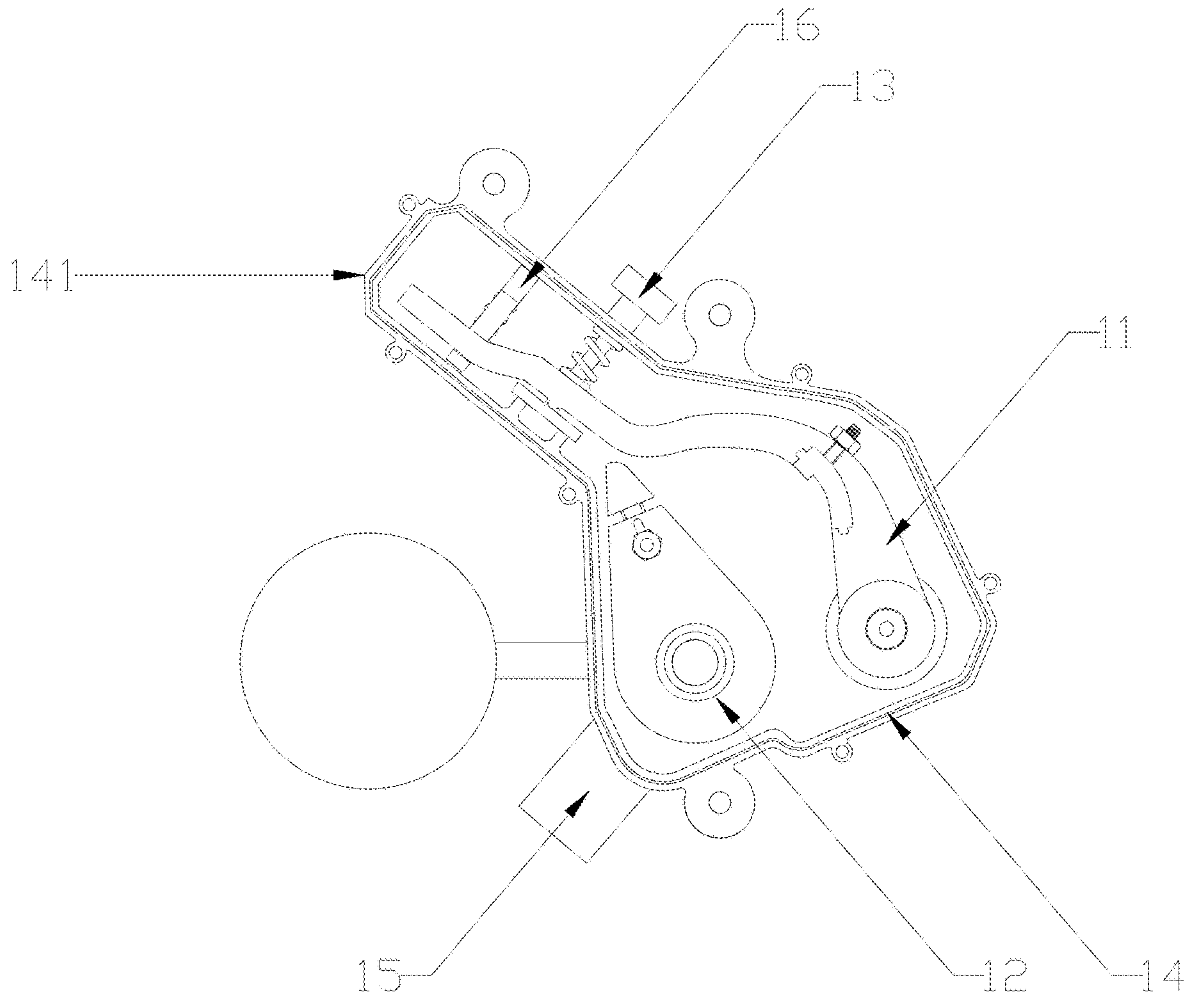
FIG. 6 is a top view of FIG. 1 with the shell cover removed.
Figure 7:
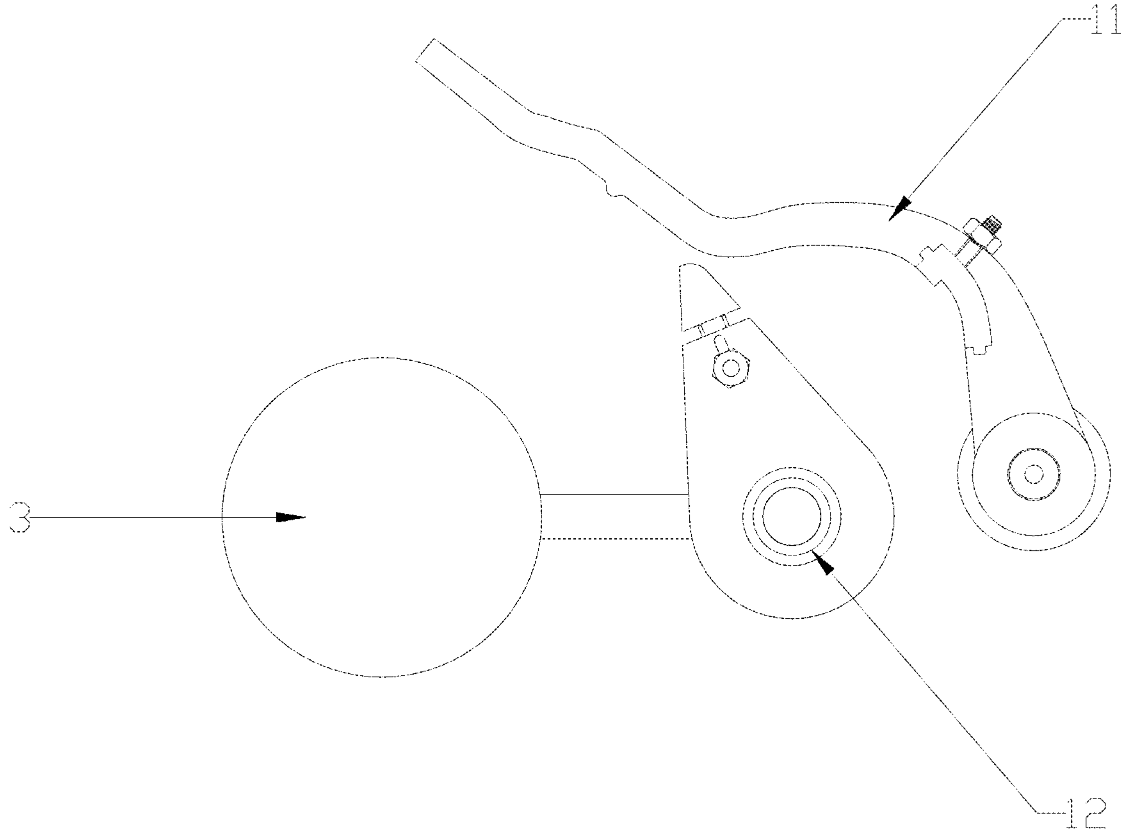
FIG. 7 is a top view of the lock rod and lock head of the engine overspeed air shut-off system of the present application when unlocked.
Figure 8:
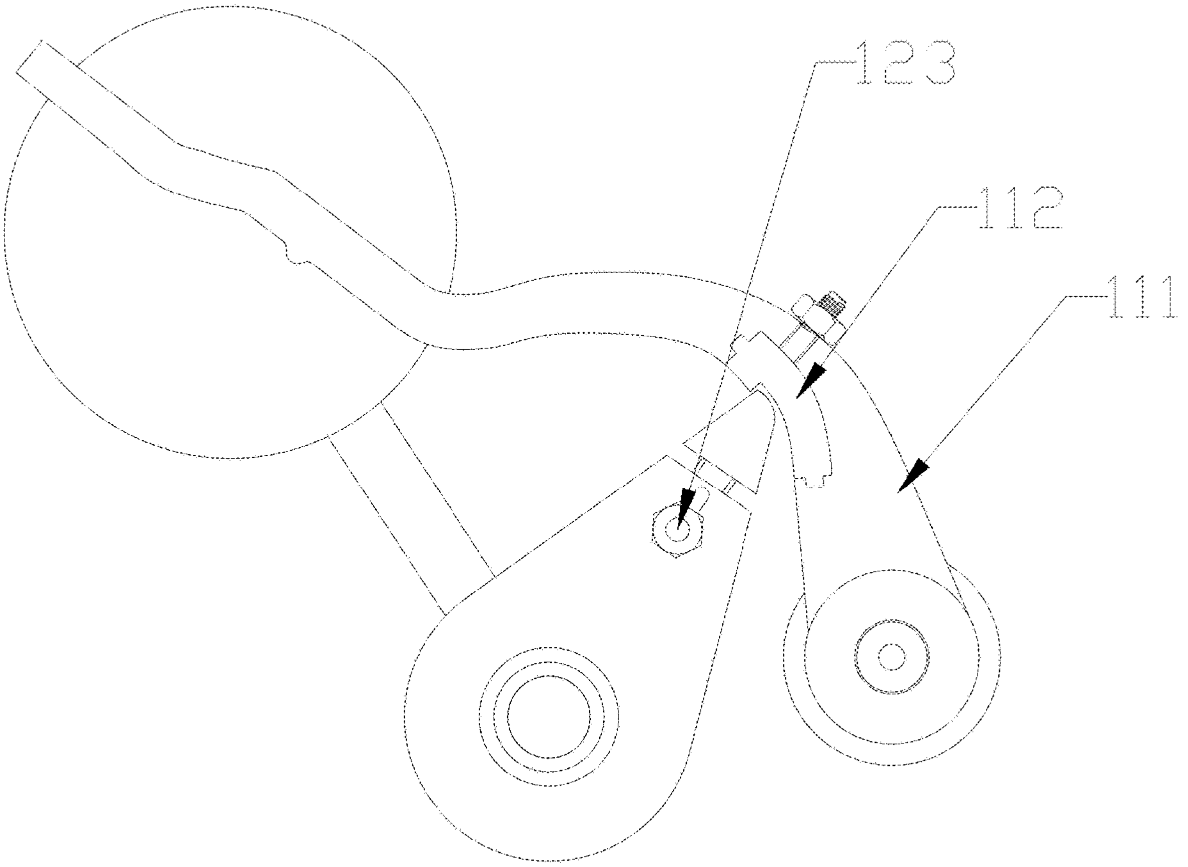
FIG. 8 is a top view of the lock rod and lock head of the engine overspeed air shut-off system of the present application when locked.
Figure 9:
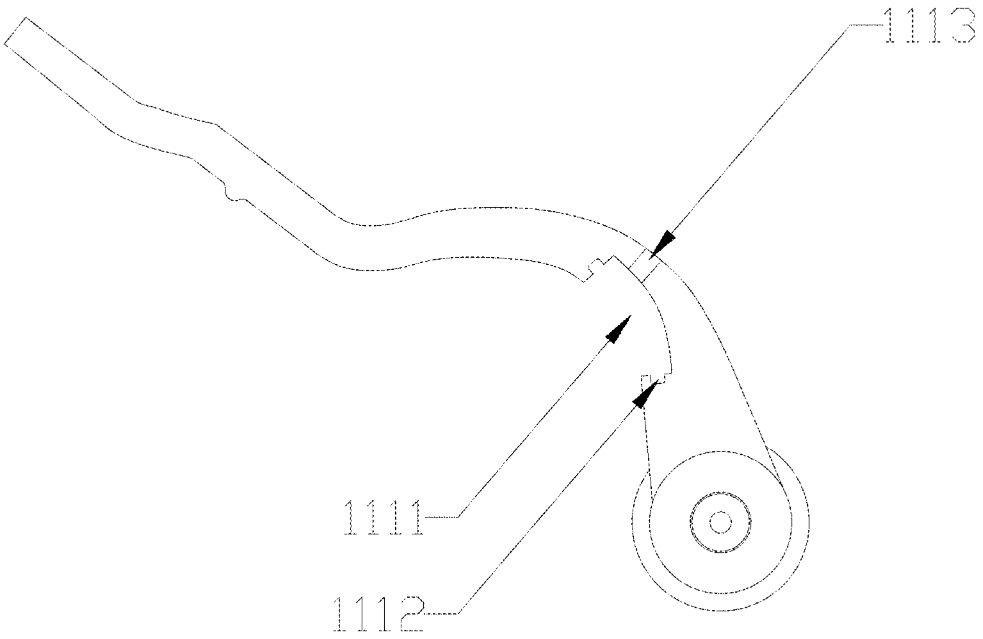
FIG. 9 is a top view of the base rod part of the engine overspeed air shut-off system of the present application.
Figure 10:
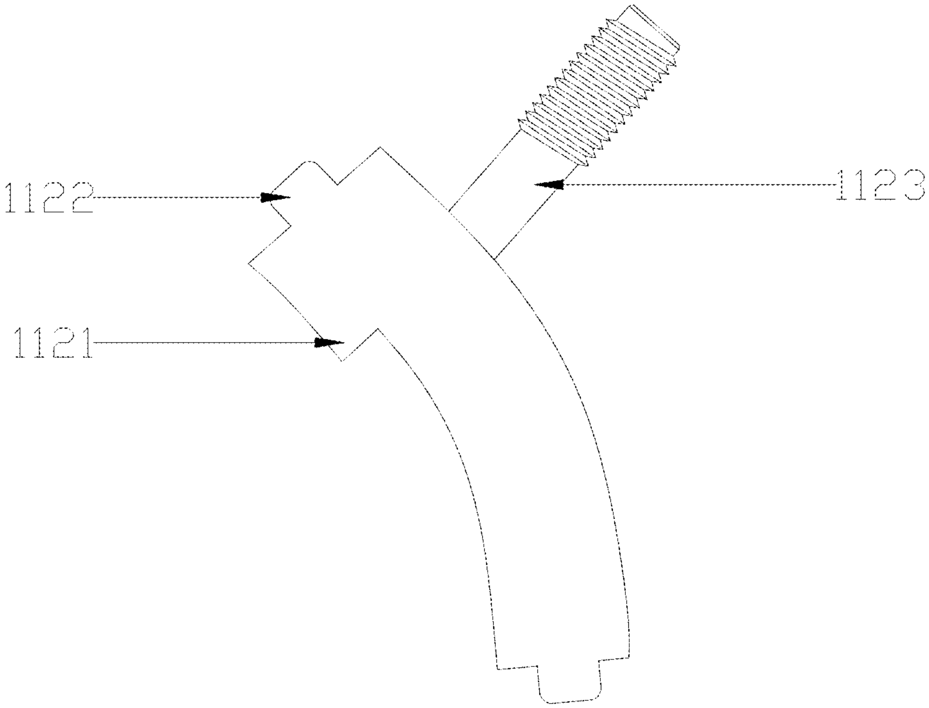
FIG. 10 is a plan view of the base block part of the engine overspeed air shut-off system of the present application.
Figure 11:
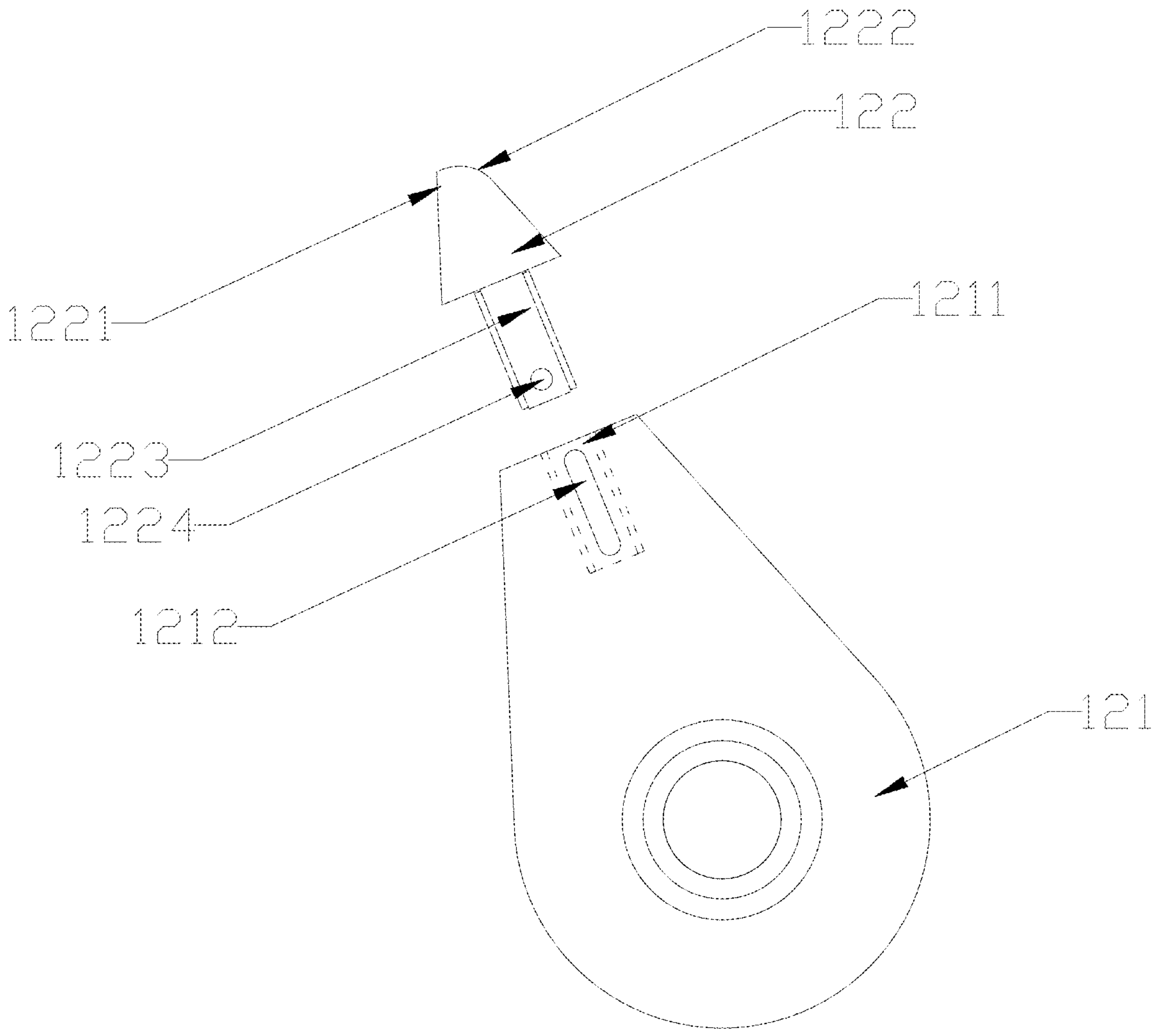
FIG. 11 is an explosion diagram of the lock head of the engine overspeed air shut-off system of the present application when the positioning bolt is removed.
Figure 12:
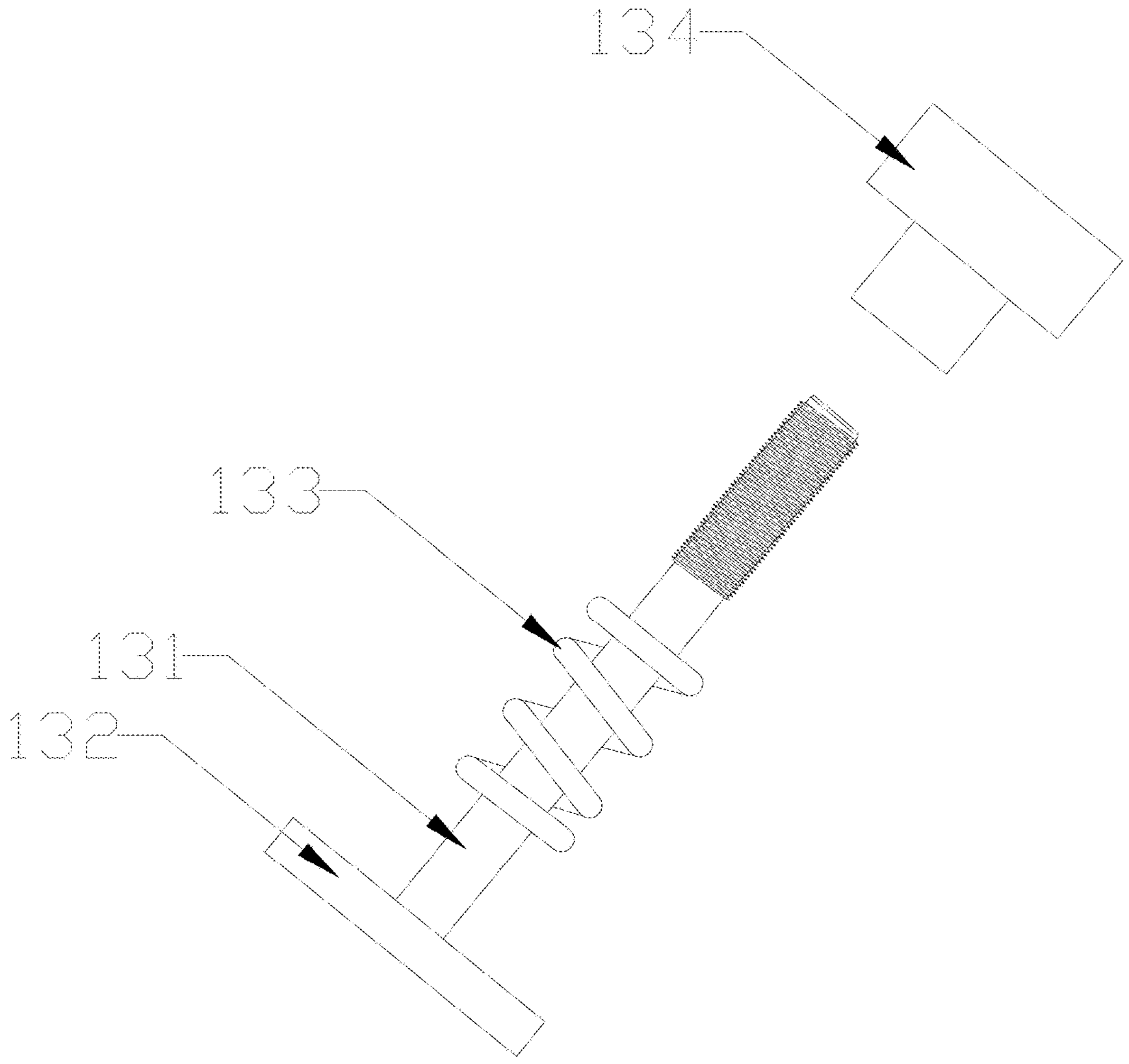
FIG. 12 is an explosion schematic diagram of the elastic return mechanism of the engine overspeed air shut-off system of the present application.
Figure 13:
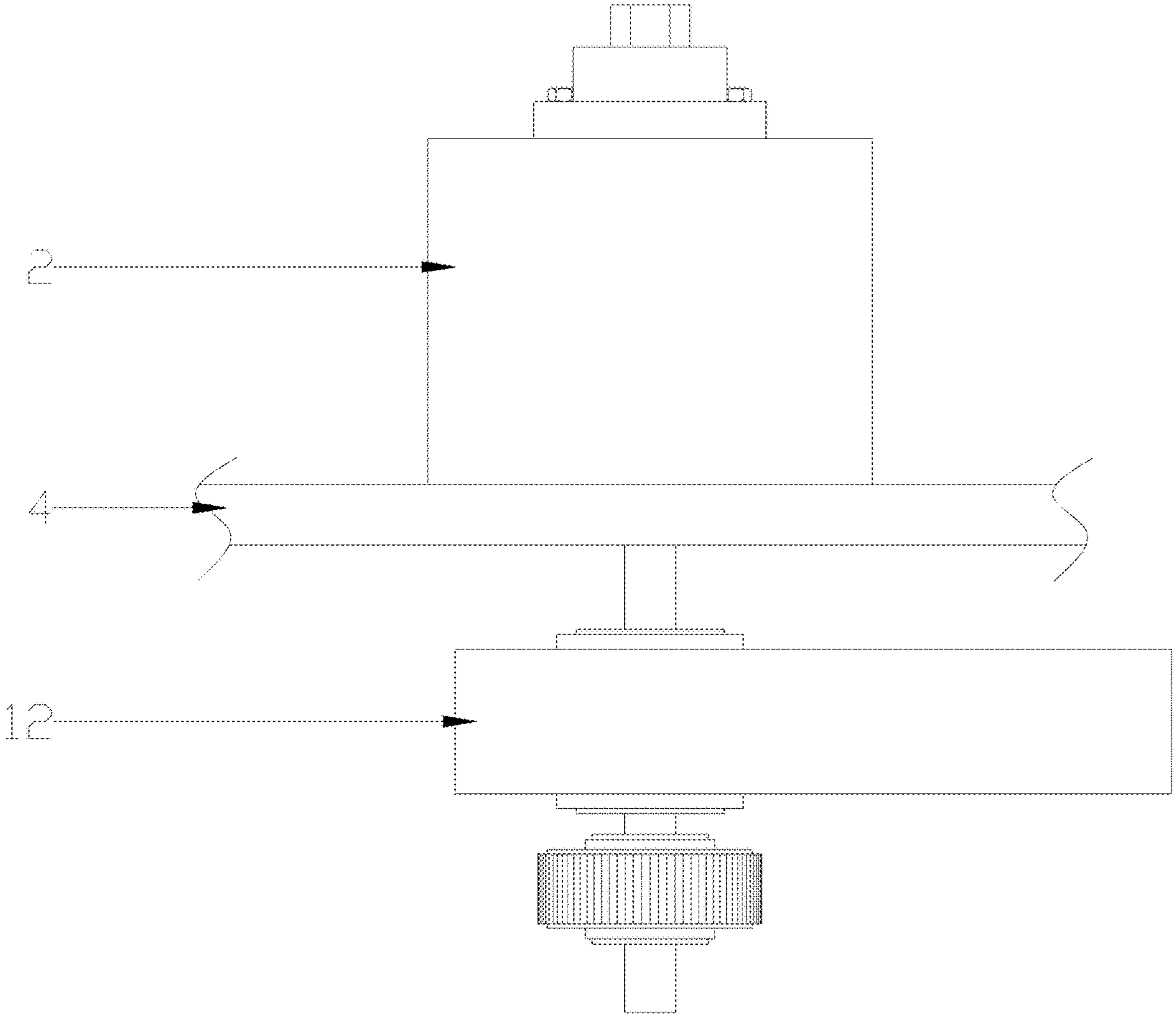
FIG. 13 is an assembly schematic diagram of the lock head, the manual locking mechanism and the support seat of the engine overspeed air shut-off system of the present application.
Figure 14:
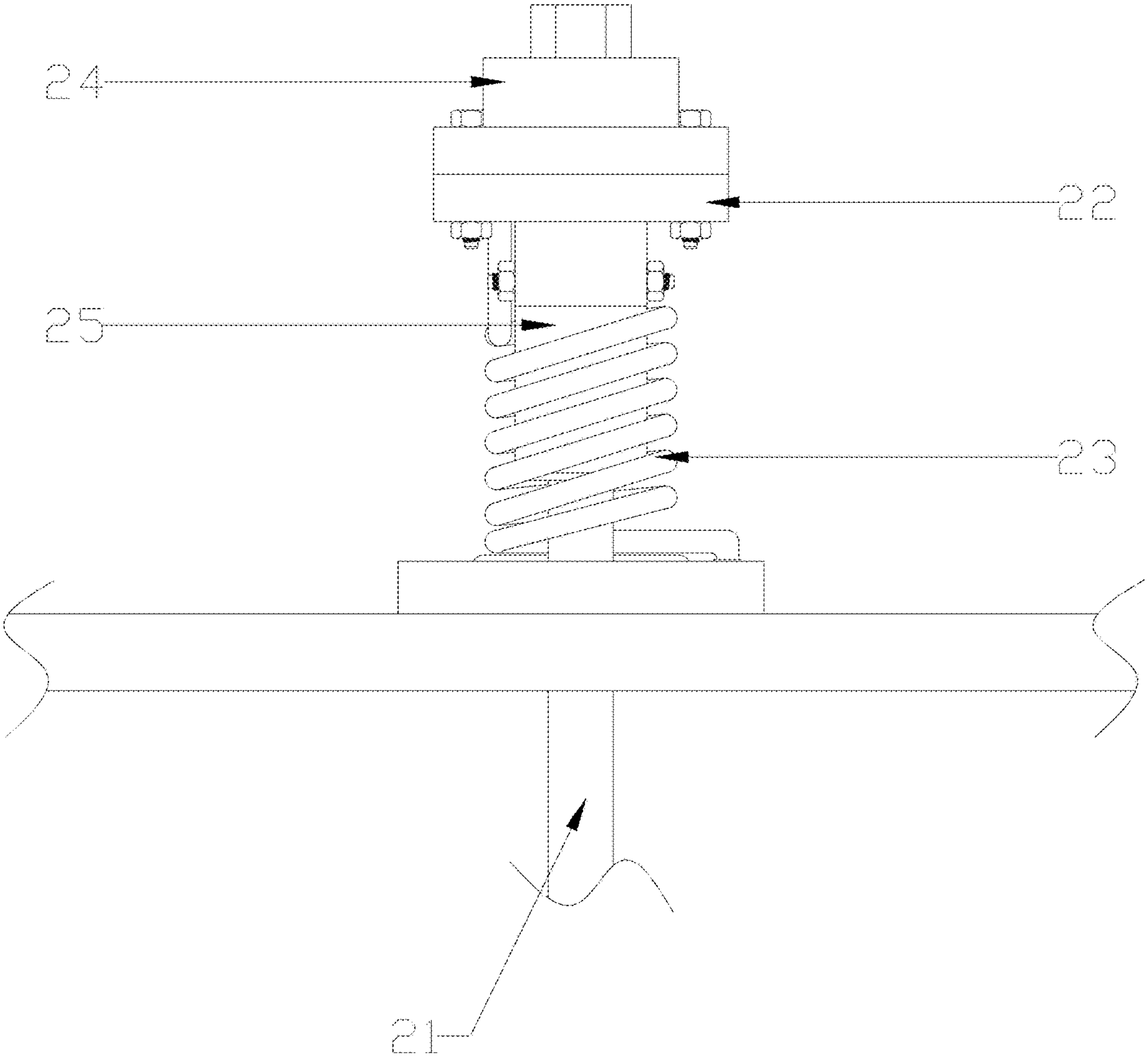
FIG. 14 is a front view of FIG. 13 when the lock head, protective cover and gear are removed.
Figure 15:
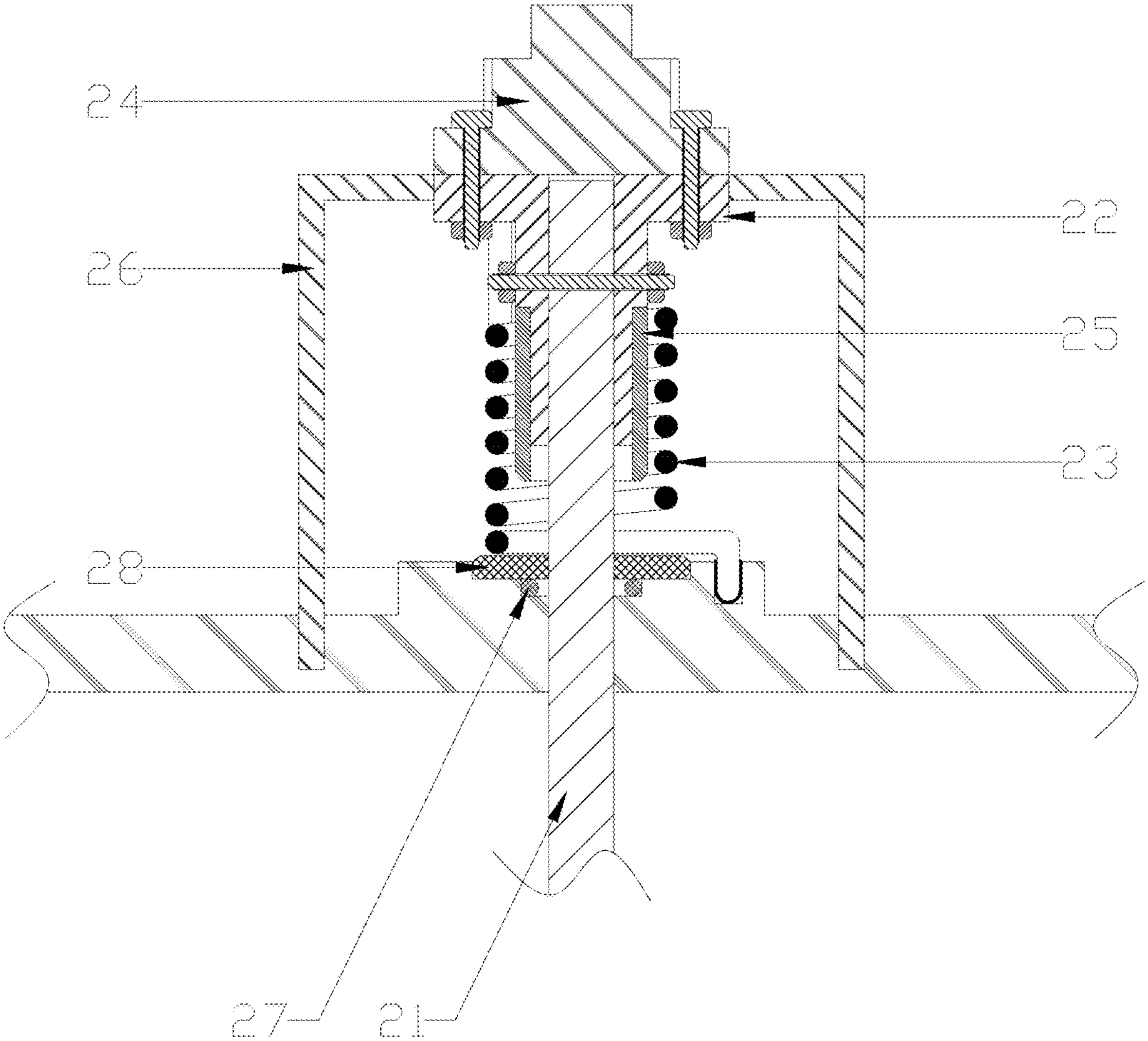
FIG. 15 is a sectional view of the manual locking mechanism of the engine overspeed air shut-off system of the present application.
Figure 16:
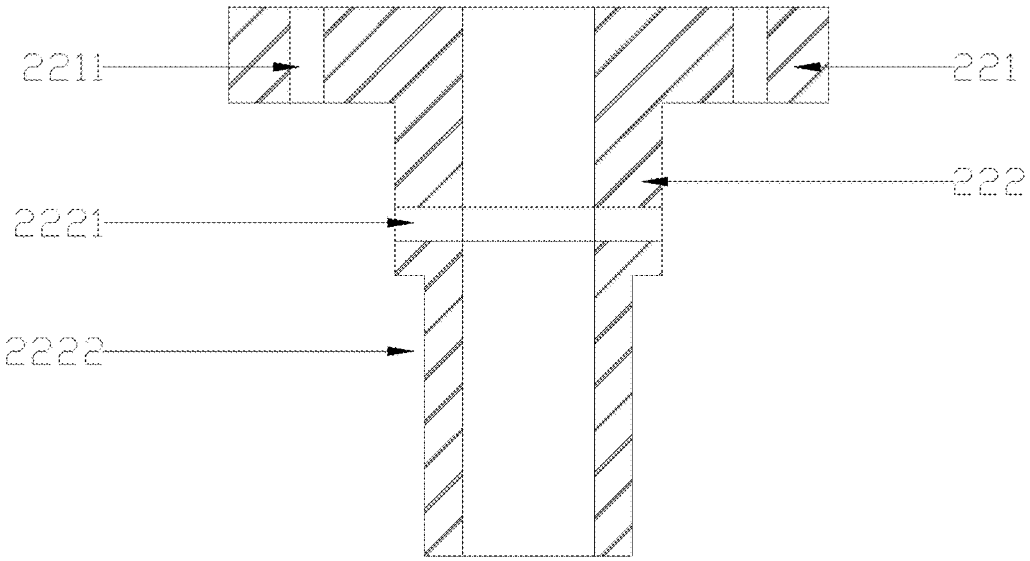
FIG. 16 is a sectional view of the coupling head of the engine overspeed air shut-off system of the present application.
Figure 17:
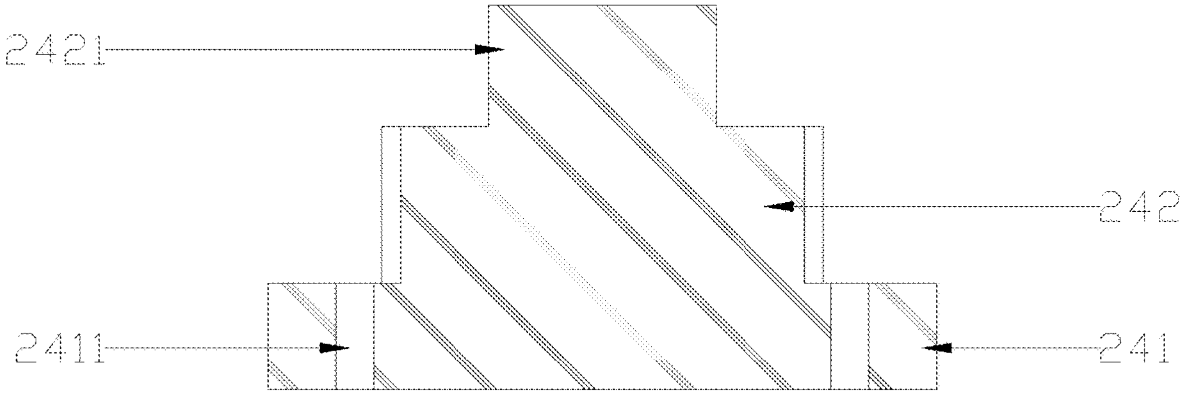
FIG. 17 is a cross-sectional view of the hand opening head of the engine overspeed air shut-off system of the present application.

During use, because one end of the lock rod 11 is rotatably connected in the shell 14, and the other end is provided with the elastic return mechanism 13 (the reset spring 133 can replace the torsion spring to give the lock rod 11 the force of counterclockwise rotation and realize the return function), the lock head 12 (linked with the valve plate 3) can cooperate with the lock rod 11 and lock the position of the valve plate 3 together when it is driven by the motor 15 to rotate to a sharp corner against the step (see FIG. 4).

In addition, if the step cannot work with the lock head 12 due to installation accuracy or wear, the user can choose the base block part 112 with the block convex corners 1121 with different sizes or shapes for replacement. If the sharp corner is worn, the pyramid 122 can be directly replaced; if maintenance is needed, the maintenance personnel can also directly hold and pull the adjustment terminal 134 outside the shell 14 to drive the lock rod 11 to move and complete the functions of unlocking between the lock rod 11 and the lock head 12.

2) The installation process and working mode of the manual locking mechanism 2 are as follows:

When the motor 15 cannot work normally (for example, when the motor 15 is damaged or power is cut off), if the maintenance worker needs to unlock the lock rod 11 and the lock head 12, he can also place a wrench at the hexagonal bump 2421, so as to manually drive the rotating shaft 21 to rotate by screwing the hand opening head 24. In addition, if the wrench releases the hexagonal bump 2421, the lock head 12 can also be reset by the reset spring 23 (before the lock rod 11 is locked with the lock head 12).

The above embodiment is an illustration of the present application, not a limitation of the present application, and any solution after simple transformation of the present application shall fall within the protection scope of the present application.

The invention claimed is:

1. An engine overspeed air shut-off system, comprising an electric locking mechanism (1), a manual locking mechanism (2), a valve plate (3) and a support seat (4), wherein the support seat (4) is installed on an air circuit of a diesel engine and is provided with an air passage communicated with the air circuit; and the valve plate (3) is rotatable under an electric or manual driving action of the electric locking mechanism (1) or the manual locking mechanism (2) to cut off or open the air passage, and wherein the electric locking mechanism (1) comprises a lock rod (11), a lock head (12), an elastic return mechanism (13), a shell (14), a motor (15) and a guide rod (16); the lock head (12) comprises a seat (121), a pyramid (122) and a positioning bolt (123); the seat (121) is hinged in the shell (14) and is driven by the motor (15) to rotate; one end of the pyramid (122) is provided with a sharp corner and the other end is inserted into the seat (121); a screw of the positioning bolt (123) is in threaded connection with the pyramid (122) after being inserted into the seat (121); the lock rod (11) comprises a base rod part (111) and a base block part (112); one end of the base rod part (111) is hinged with the shell (14), while the other end is guided by the guide rod (16) and can automatically approach the lock head (12) under the drive of the elastic return mechanism (13); the base block part (112) is detachably connected with the base rod part (111), and an outer wall of the base block part (112) is provided with a block convex corner (1121) and forms a step which can be matched with the sharp corner.

2. The engine overspeed air shut-off system according to claim 1, wherein a rod through groove (1111) penetrating a top surface and a bottom surface is formed on the base rod part (111); the base block part (112) is inserted into the rod through groove (1111), and a groove wall of the rod through groove (1111) is provided with a plurality of rod guide grooves (1111); the base block part (112) is provided with a plurality of block ribs (1122) corresponding to respective rod guide groove (1112) one by one, the top surface of the base rod part (111) is further provided with a rod lower groove (1113), and a side of the base block part (112) facing away from the block convex corner (1121) is provided with a block screw (112); a free end of the block screw (1123) is threaded with a block nut after passing through the base rod part (111) along the rod lower groove (1113).

3. The engine overspeed air shut-off system according to claim 1, wherein the sharp corner is composed of a cone inclined surface (1221) and a cone cambered surface (1222) that are intersecting with each other, and a cone insert post (1223) with a cone screw hole (1224) is arranged above the pyramid (122); the seat (121) is provided with a seat socket (1211) into which the cone insert post (1223) can be inserted and a seat long slot (1212) penetrating the top surface and the seat socket (1211), and the cone screw hole (1224) is movable along the seat long slot (1212) when the cone insert post (1223) is inserted or pulled out of the seat socket (1211).

4. The engine overspeed air shut-off system according to claim 1, wherein the shell (14) comprises a shell body (141) and a shell cover (142), and the elastic return mechanism (13) comprises a stem (131), a backing plate (132), a reset spring (133) and an adjusting terminal (134); one end of the stem (131) is screwed into the backing plate (132), while the other end is screwed through the adjusting terminal (134) after passing through the base rod part (111), the reset spring (133) and the shell body (141) successively; the reset spring (133) has an elastic tendency of elongation, so that one end thereof and the backing plate (132) jointly clamp the lock rod (11) and the other end thereof and the adjusting terminal (134) jointly clamp the shell (141); and a top opening of the shell body (141) is closed by the shell cover (142).

5. The engine overspeed air shut-off system according to claim 1, wherein the manual locking mechanism (2) comprises a rotating shaft (21), a reset spring (23) and a hand opening (24), wherein one end of the rotating shaft (21) is fixed with the lock head (12) and the other end is coaxially connected with the hand opening (24) after passing through the support seat (4); the reset spring (23) is sleeved outside the rotating shaft (21) and can realize the reset of the rotating shaft (21) by an elastic force.

6. The engine overspeed air shut-off system according to claim 2, wherein the manual locking mechanism (2) comprises a rotating shaft (21), a reset spring (23) and a hand opening (24), wherein one end of the rotating shaft (21) is fixed with the lock head (12) and the other end is coaxially connected with the hand opening (24) after passing through the support seat (4); the reset spring (23) is sleeved outside the rotating shaft (21) and can realize the reset of the rotating shaft (21) by an elastic force.

7. The engine overspeed air shut-off system according to claim 3, wherein the manual locking mechanism (2) comprises a rotating shaft (21), a reset spring (23) and a hand opening (24), wherein one end of the rotating shaft (21) is fixed with the lock head (12) and the other end is coaxially connected with the hand opening (24) after passing through the support seat (4); the reset spring (23) is sleeved outside the rotating shaft (21) and can realize the reset of the rotating shaft (21) by an elastic force.

8. The engine overspeed air shut-off system according to claim 4, wherein the manual locking mechanism (2) comprises a rotating shaft (21), a reset spring (23) and a hand opening (24), wherein one end of the rotating shaft (21) is fixed with the lock head (12) and the other end is coaxially connected with the hand opening (24) after passing through the support seat (4); the reset spring (23) is sleeved outside the rotating shaft (21) and can realize the reset of the rotating shaft (21) by an elastic force.

9. The engine overspeed air shut-off system according to claim 5, wherein the manual locking mechanism (2) further comprises a coupling head (22), which comprises a coupling plate (221) and a coupling sleeve (222); the coupling sleeve (222) is integrally arranged at the bottom of the coupling plate (221) and a central passage is arranged between the coupling sleeve (222) and the coupling plate (221) in a penetrating manner; the coupling sleeve (222) is provided with a plurality of sleeve transverse holes (2221) communicated with the central channel respectively, a top end of the rotating shaft (21) is inserted into the central channel and provided with a plurality of shaft transverse holes corresponding to each sleeve transverse hole (2221) respectively;

and the rotating shaft (21) and the coupling sleeve (222) are detachably connected by fasteners passing through the corresponding shaft transverse holes and sleeve transverse holes (2221).

10. The engine overspeed air shut-off system according to claim 6, wherein the manual locking mechanism (2) further comprises a coupling head (22), which comprises a coupling plate (221) and a coupling sleeve (222); the coupling sleeve (222) is integrally arranged at the bottom of the coupling plate (221) and a central passage is arranged between the coupling sleeve (222) and the coupling plate (221) in a penetrating manner; the coupling sleeve (222) is provided with a plurality of sleeve transverse holes (2221) communicated with the central channel respectively, a top end of the rotating shaft (21) is inserted into the central channel and provided with a plurality of shaft transverse holes corresponding to each sleeve transverse hole (2221) respectively; and the rotating shaft (21) and the coupling sleeve (222) are detachably connected by fasteners passing through the corresponding shaft transverse holes and sleeve transverse holes (2221).

11. The engine overspeed air shut-off system according to claim 7, wherein the manual locking mechanism (2) further comprises a coupling head (22), which comprises a coupling plate (221) and a coupling sleeve (222); the coupling sleeve (222) is integrally arranged at the bottom of the coupling plate (221) and a central passage is arranged between the coupling sleeve (222) and the coupling plate (221) in a penetrating manner; the coupling sleeve (222) is provided with a plurality of sleeve transverse holes (2221) communicated with the central channel respectively, a top end of the rotating shaft (21) is inserted into the central channel and provided with a plurality of shaft transverse holes corresponding to each sleeve transverse hole (2221) respectively; and the rotating shaft (21) and the coupling sleeve (222) are detachably connected by fasteners passing through the corresponding shaft transverse holes and sleeve transverse holes (2221).

12. The engine overspeed air shut-off system according to claim 8, wherein the manual locking mechanism (2) further comprises a coupling head (22), which comprises a coupling plate (221) and a coupling sleeve (222); the coupling sleeve (222) is integrally arranged at the bottom of the coupling plate (221) and a central passage is arranged between the coupling sleeve (222) and the coupling plate (221) in a penetrating manner; the coupling sleeve (222) is provided with a plurality of sleeve transverse holes (2221) communicated with the central channel respectively, a top end of the rotating shaft (21) is inserted into the central channel and provided with a plurality of shaft transverse holes corresponding to each sleeve transverse hole (2221) respectively; and the rotating shaft (21) and the coupling sleeve (222) are detachably connected by fasteners passing through the corresponding shaft transverse holes and sleeve transverse holes (2221).

13. The engine overspeed air shut-off system according to claim 9, wherein a plurality of plate lower through holes (2211) arranged around the coupling sleeve (222) are provided on the coupling plate (221); the hand opening (24) comprises a hand opening plate (241) and a hand opening sleeve (242), and the hand opening sleeve (242) is integrally arranged on the top of the hand opening plate (241), with a top surface being provided with a hexagonal bump (2421); the hand opening plate (241) is provided with a plurality of plate upper through holes (2411) corresponding to each of the plate lower through holes (2211) respectively, and the coupling plate (221) and the hand opening plate (241) are detachably connected by fasteners penetrating the corresponding plate lower through holes (2211) and the plate upper through holes (2411).

14. The engine overspeed air shut-off system according to claim 10, wherein a plurality of plate lower through holes (2211) arranged around the coupling sleeve (222) are provided on the coupling plate (221); the hand opening (24) comprises a hand opening plate (241) and a hand opening sleeve (242), and the hand opening sleeve (242) is integrally arranged on the top of the hand opening plate (241), with a top surface being provided with a hexagonal bump (2421); the hand opening plate (241) is provided with a plurality of plate upper through holes (2411) corresponding to each of the plate lower through holes (2211) respectively, and the coupling plate (221) and the hand opening plate (241) are detachably connected by fasteners penetrating the corresponding plate lower through holes (2211) and the plate upper through holes (2411).

15. The engine overspeed air shut-off system according to claim 11, wherein a plurality of plate lower through holes (2211) arranged around the coupling sleeve (222) are provided on the coupling plate (221); the hand opening (24) comprises a hand opening plate (241) and a hand opening sleeve (242), and the hand opening sleeve (242) is integrally arranged on the top of the hand opening plate (241), with a top surface being provided with a hexagonal bump (2421); the hand opening plate (241) is provided with a plurality of plate upper through holes (2411) corresponding to each of the plate lower through holes (2211) respectively, and the coupling plate (221) and the hand opening plate (241) are detachably connected by fasteners penetrating the corresponding plate lower through holes (2211) and the plate upper through holes (2411).

16. The engine overspeed air shut-off system according to claim 12, wherein a plurality of plate lower through holes (2211) arranged around the coupling sleeve (222) are provided on the coupling plate (221); the hand opening (24) comprises a hand opening plate (241) and a hand opening sleeve (242), and the hand opening sleeve (242) is integrally arranged on the top of the hand opening plate (241), with a top surface being provided with a hexagonal bump (2421); the hand opening plate (241) is provided with a plurality of plate upper through holes (2411) corresponding to each of the plate lower through holes (2211) respectively, and the coupling plate (221) and the hand opening plate (241) are detachably connected by fasteners penetrating the corresponding plate lower through holes (2211) and the plate upper through holes (2411).

17. The engine overspeed air shut-off system according to claim 13, wherein a sleeve ring groove (2222) located below each sleeve transverse hole (2221) is arranged on the coupling sleeve (222); an isolation sleeve (25) is sleeved outside the sleeve ring groove (2222), and the rotating shaft (21), the coupling head (22) and the reset spring (23) are simultaneously covered with a protective cover (26) with a notch at the top; the top surface of the support seat (4) is further provided with a stepped groove with a big top and a small bottom; a shaft sealing ring (27) is built in a lower section of the stepped groove and a shaft pressing ring (28) is built in an upper section; the shaft sealing ring (27) is confined between the rotating shaft (21), the shaft pressing ring (28) and the support seat (4); and two ends of the reset spring (23) are respectively fixed with the coupling head (22) and the support seat (4).

18. The engine overspeed air shut-off system according to claim 14, wherein a sleeve ring groove (2222) located below each sleeve transverse hole (2221) is arranged on the coupling sleeve (222); an isolation sleeve (25) is sleeved outside the sleeve ring groove (2222), and the rotating shaft (21), the coupling head (22) and the reset spring (23) are simultaneously covered with a protective cover (26) with a notch at the top; the top surface of the support seat (4) is further provided with a stepped groove with a big top and a small bottom; a shaft sealing ring (27) is built in a lower section of the stepped groove and a shaft pressing ring (28) is built in an upper section; the shaft sealing ring (27) is confined between the rotating shaft (21), the shaft pressing ring (28) and the support seat (4); and two ends of the reset spring (23) are respectively fixed with the coupling head (22) and the support seat (4).

19. The engine overspeed air shut-off system according to claim 1, wherein the support seat (4) comprises a base body (41) and a base cover (42), which are detachably connected by fasteners and are respectively provided with corresponding body holes (411) and cover holes (421), wherein the body hole (411) and the cover hole (421) together form an air passage; the adjacent surfaces of the base body (41) and the base cover (42) are also provided with concave parts for the valve plate (3) to move, and the electric locking mechanism (1) and the manual locking mechanism (2) are respectively arranged on the opposite surfaces of the base body (41) and the base cover (42).

* * * * *